United States Patent
Sprakel

(10) Patent No.: US 11,538,321 B2
(45) Date of Patent: Dec. 27, 2022

(54) PARKING SPACE MANAGEMENT SYSTEM AND EVALUATION UNIT FOR A PARKING SPACE MANAGEMENT SYSTEM

(71) Applicant: FOGTEC Brandschutz GmbH, Cologne (DE)

(72) Inventor: Dirk K. Sprakel, Cologne (DE)

(73) Assignee: FOGTEC Brandschutz GmbH, Cologne (DE)

( * ) Notice: Subject to any disclaimer, the term of this patent is extended or adjusted under 35 U.S.C. 154(b) by 0 days.

(21) Appl. No.: 17/771,371

(22) PCT Filed: Oct. 16, 2020

(86) PCT No.: PCT/EP2020/079165
§ 371 (c)(1),
(2) Date: Apr. 22, 2022

(87) PCT Pub. No.: WO2021/078639
PCT Pub. Date: Apr. 29, 2021

(65) Prior Publication Data
US 2022/0351594 A1    Nov. 3, 2022

(30) Foreign Application Priority Data
Oct. 25, 2019   (DE) .................... 10 2019 128 864.9

(51) Int. Cl.
| | |
|---|---|
| *G08B 17/06* | (2006.01) |
| *G01K 7/16* | (2006.01) |
| *G01K 11/32* | (2021.01) |
| *G01K 3/14* | (2006.01) |

(52) U.S. Cl.
CPC ............... *G08B 17/06* (2013.01); *G01K 3/14* (2013.01); *G01K 7/16* (2013.01); *G01K 11/32* (2013.01)

(58) Field of Classification Search
CPC .......... G08B 17/06; G08G 1/141; G01K 7/16; G01K 7/00
See application file for complete search history.

(56) References Cited

U.S. PATENT DOCUMENTS

| | | | |
|---|---|---|---|
| 9,177,221 B2 * | 11/2015 | Nagy | B60L 53/65 |
| 10,896,608 B2 * | 1/2021 | Homutescu | G08G 1/143 |
| 2012/0236149 A1 * | 9/2012 | Nagy | B60L 53/65 348/148 |
| 2017/0004709 A1 * | 1/2017 | Nordbruch | G08G 1/146 |
| 2019/0272753 A1 * | 9/2019 | Homutescu | G08G 1/141 |

FOREIGN PATENT DOCUMENTS

| | | |
|---|---|---|
| DE | 102018201517 A1 | 8/2019 |
| EP | 2500888 A1 | 9/2012 |
| JP | 2016103926 A | 6/2016 |

* cited by examiner

*Primary Examiner* — Hoi C Lau
(74) *Attorney, Agent, or Firm* — The Webb Law Firm

(57) ABSTRACT

Provided is a parking space management system including a temperature sensor which can be attached to the floor of a parking lot and evaluation unit connected to the temperature sensor. The evaluation unit uses the temperature sensor to evaluate at least one temperature profile in the region of the temperature sensor and outputs a signal depending on the temperature profile.

10 Claims, 6 Drawing Sheets

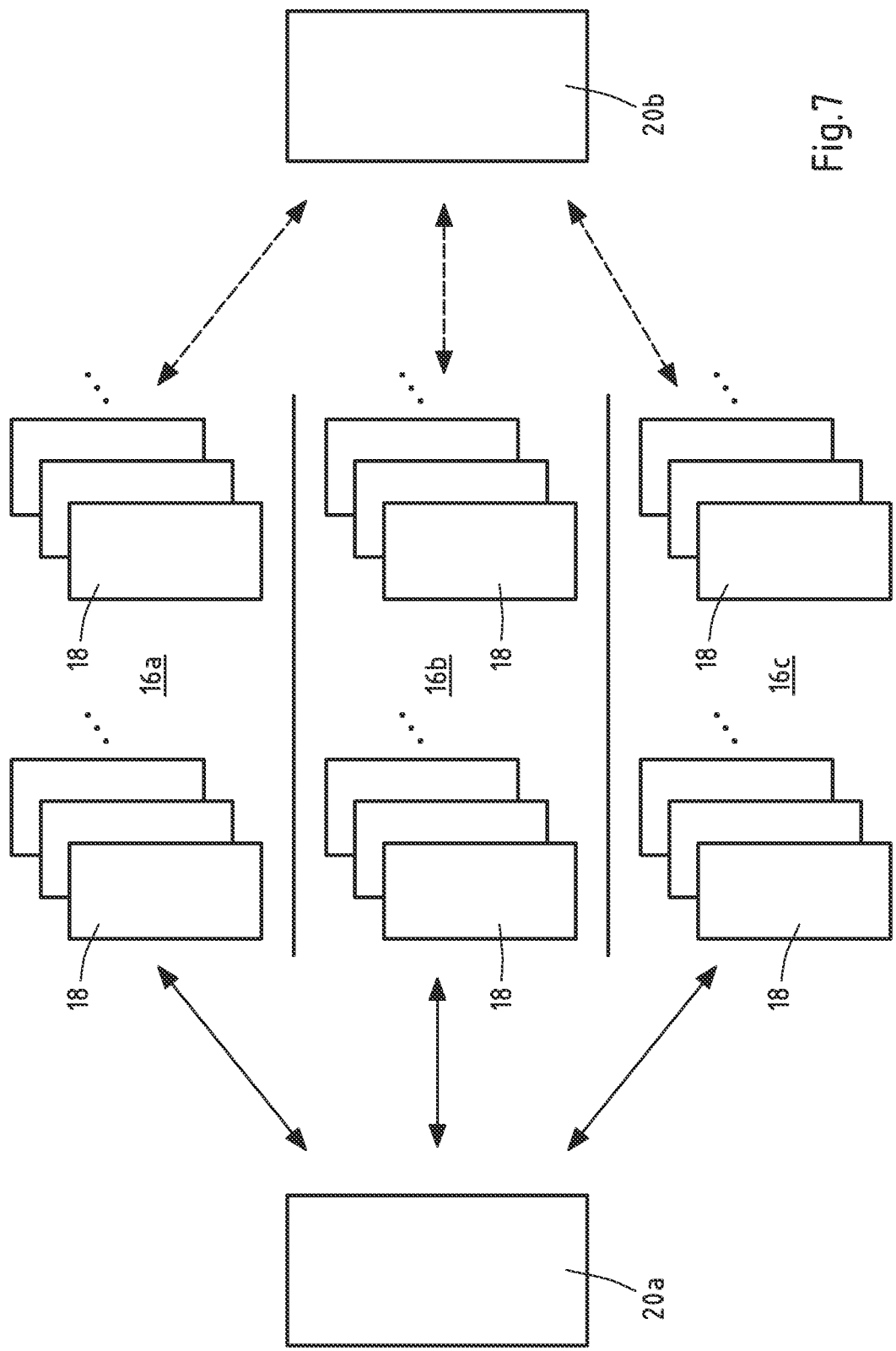

PARKING SPACE MANAGEMENT SYSTEM AND EVALUATION UNIT FOR A PARKING SPACE MANAGEMENT SYSTEM

CROSS-REFERENCE TO RELATED APPLICATIONS

This application is the United States national phase of International Application No. PCT/EP2020/079165 filed Oct. 16, 2020, and claims priority to German Patent Application No. 10 2019 128 864.9 filed Oct. 25, 2019, the disclosures of which are hereby incorporated by reference in their entirety.

BACKGROUND OF THE INVENTION

Field of the Invention

The subject matter relates to a parking space management system as well as an evaluation unit for a parking space management system.

Description of Related Art

Firefighting systems for parking space management systems are well known and often required by law. In particular, parking garages or underground garages are exposed to considerable fire risks due to their structural density and proximity of vehicles to each other and the high fire loads associated with this. Until now, a fire in a parking area could always be expected to involve the burning of the fossil fuels of the vehicle drives. This was insofar "favorable" as the fire department always knew which materials were on fire and could initiate firefighting tailored thereto.

Due to the diversification of the different drive types, caused by the energy transition, in case of a fire in a parking garage or an underground parking lot, it is no longer clear in advance of firefighting what the cause of the fire is and what the fire load is. So-called new energy carriers (NEC) are vehicles with alternative drive systems to combustion engines. This goes from gas vehicles, over hybrid-electric vehicles and plug-in hybrid-electric vehicles to purely electric vehicles and also vehicles powered by fuel cells (possibly using hydrogen). Especially battery-based vehicles with hybrid drive (hybrid electric vehicle (HEV)), plug-in hybrid drives (plug-in electric vehicle (PEV)) and pure battery drives (battery electric vehicle (BEV)) always include a battery for energy storage. Batteries known to date for automotive use are lithium-ion batteries, which pose a significant fire risk and are difficult to extinguish in the event of a fire, requiring appropriate measures. These new vehicles pose previously unknown problems for firefighting. For example, in the case of gas or hydrogen-powered vehicles, the heat generated by the fire load can collect under the ceiling of the parking garage or escape in other directions. Therefore, also these fires are difficult to control. If approached, there may be a danger of explosion. In any case, a completely different attack strategy for the fire department and, if necessary, a fixed fire-fighting system (FFFS) may be required than is the case with "conventional" drives.

A monitoring of the temperature of an electrically driven vehicle in order to avoid dangerous over-heating is known as a security measure at least from JP2016103926A. Here, a temperature sensor of a charging stations arranged on the ground is used to choose the charging power in a way to avoid over-heating. The problem of a fire caused by over-heating is not taking into considerations, however.

A surveillance of a parking area by means of, among others, infrared cameras has been proposed by EP2500888A1. These cameras allow for the detection of the over-heating of an electrical vehicle during its charging. No instructions for an improved handing or preparation of a fire situation are given, however.

DE102018201517A1 proposes an internal temperature monitoring inside a vehicle.

SUMMARY OF THE INVENTION

The subject matter was therefore based on the object of optimizing firefighting in parking space management systems.

This object is solved by a parking space management system and an evaluation unit as described herein.

According to the subject matter, it has been recognized that the temperature behavior of a vehicle differs depending on the drive type. Both when arriving and parking the vehicle, i.e. during the cooling process after a trip, and when a fire occurs, i.e. during the initial heating-up process up to a fire, the temperature behavior is strongly dependent on the drive type.

In the broadest sense, a drive type can refer to both the powertrain and to the storage technology used to store the drive energy. A powertrain can be based on a combustion engine or on an electric motor. A storage technology may involve a liquid fuel tank, a gas tank, or a battery. A battery may include different technologies, such as Li-ion batteries, lead acid batteries, lithium polymer batteries, etc. For the sake of simplicity, only drive type will be referred to in the following.

Additionally, the position of so-called hotspots, i.e. areas where the vehicle heats up particularly strongly, is also highly variable in the area of the underbody of vehicles with different drive types. The subject matter makes use of this circumstance by providing a temperature sensor that can be attached to the floor of a parking lot. Through the temperature sensor, which is preferably capable of detecting a temperature profile not only at points but in particular along a line and/or over an area, the temperature at the underbody of a vehicle can be detected over the course of the parking period.

The temperature sensor is connected to an evaluation unit. The connection can be wired or wireless.

To determine the fire load, in order to inform the fire department of possible hazards and fire-fighting strategies before or on arrival at the source of the fire, it is proposed that the evaluation unit with the help of the temperature sensor evaluates at least one temperature profile in the area of the temperature sensor and outputs a signal depending on the temperature profile. The signal is in particular a fire alarm signal or a fire pre-alarm.

A temperature profile can be both temporal and spatial. A temporal temperature profile can represent the temperature over time. A spatial temperature profile can represent, for example, a temperature along at least one extension axis (one-dimensional) of the temperature sensor, in particular along two axes (two-dimensional).

As explained at the beginning, the temperature profile of different drive types are highly different.

For example, in the case of a combustion engine, an increased temperature is to be expected in the front area of the vehicle at the beginning of the parking process, since the combustion engine is located there. The temperature usually decreases linearly or degressively, depending on whether the engine's radiator is running after stopping the engine or not.

After cooling, the temperature remains low. The hotspot of the temperature profile usually lies in the area of the engine block or the tank of the vehicle.

In the case of a battery-powered vehicle with a fuel cell, a low temperature in the area of the front of the vehicle can be expected at the beginning of the parking process, since an electric motor heats up less than a combustion engine. The temperature generally decreases linearly. After cooling, the temperature remains low. In the event of a fire, however, and especially before the formation of a fire, the battery will generally heat up. This heating process takes place over a few minutes, and is in particular considerably longer than in the case of a fossil fuel fire. However, once a so-called "tripping point" is reached, the temperature rises rapidly, culminating in the fire or explosion of the battery. The hotspot of the temperature profile is usually in the center of the vehicle, as this is where the battery is typically located.

In the case of a hydrogen-powered vehicle, a low temperature in the area of the front of the vehicle can be expected at the beginning of the parking process, since an electric motor heats up less than a combustion engine. The temperature generally decreases linearly. After cooling, the temperature remains low. In the event of a fire, the temperature rise will generally be even faster than for a vehicle with a combustion engine, since the hydrogen will react immediately and explode. The hotspot of the temperature curve is usually in the area of the vehicle's tank.

The mentioned drive types are purely exemplary. There exist also gas-powered vehicles, for example, as well as hydrogen vehicles with combustion engines, which also have typical temperature profiles.

This and other information on the temperature profile can be stored in the evaluation unit in order to add an information to the signal from which a probable fire load results. The signal can, for example, contain an information about a drive type of the vehicle at a respective parking lot.

A temperature sensor can be exclusively assigned to a parking lot. In this case, the evaluation unit can determine not only the temperature profile but also the location of the temperature profile, in particular the parking lot. Thus, information about the parking lot itself, that is, a spatial information about the parking lot or a designation of the parking lot, can be added to the signal.

According to an embodiment, it is proposed that the temperature sensor is an optical fiber line. With the aid of such an optical fiber line, temperature sensing can be performed, in particular, in a structurally compact manner at the bottom of the parking lot. A fiber line can have a longitudinal extent and a temperature profile can be determined locally resolved along the fiber line.

The fiber line is in particular a fiber optic line, in particular a fiber optic fire alarm cable. Such fiber optic fire alarm cables are already known and are used, for example, in the ceiling area of tunnels in order to be able to perform temperature sensing over long distances.

However, the temperature sensor can also be an electrical sensor, for example a sensor based on a resistance wire. Such a sensor can be divided into sections, which can be evaluated individually, for spatial resolution. A temperature sensor based on an electrical resistor, for example an NTC resistor, is also conceivable.

To prevent the temperature sensor from being damaged by vehicles driving over it, it is suggested that the temperature sensor is integrated into the floor of the parking lot. During construction of the parking lot, the temperature sensor can for example be embedded before the top surface layer is applied. For a later installation, it is possible, for example, that the top surface layer is slit open, the temperature sensor is inserted and then the slit is sealed, for example with a bitumen.

As already explained at the beginning, it can be stored in the evaluation unit which temperature profile is characteristic for which vehicle type, in particular which drive type. Thus, different characterizing temperature profiles can be stored in the evaluation unit for one vehicle type and/or for one drive type respectively. A cluster of typical temperature profiles can be stored in the evaluation unit for each drive type.

The captured temperature profile is compared with the stored temperature profiles. In particular, this can be done through a cross-correlation of the captured temperature profile with the stored temperature profile, both resolved in time and spatially. Such a method is, for example, an SSD method. It can be determined to which of the stored temperature profiles the captured temperature profile is most similar. Also, for example, a sum of all deviations of the captured temperature profile with all temperature profile belonging to a cluster can be formed and the absolute value of the sum or a normalized value of the sum for all clusters is compared with each other. The smallest deviation amount can be used to determine the cluster that is most probable for the acquired temperature profile. Depending on the comparison, the evaluation unit can determine a drive type of the vehicle parked in the parking lot. In any case, a very high temperature and thus a fire can always be detected. Even if no knowledge about the type of the vehicle is available or can be recognized from the temperature profile. Thus, the system could assign the fire to a location even without evaluating the specifics of a temperature profile.

In addition, if location sensors are available and the system knows the specific type of vehicle at the specific location, unusual temperature profiles can be recognized as such more quickly. Thus, the system would wait for an E-curve in the case of an E-car, etc.

To optimize the detection of a fire, it is helpful to know the drive type before a fire even emerges. Therefore, it is proposed that temporally at first, a first temperature profile is evaluated. Depending on this, for example when a vehicle drives into the parking lot and the parking process begins, the drive type of the parked vehicle can be determined. This determined drive type is stored for this parking lot until the vehicle leaves the parking lot. Then this memory can be erased and rewritten, for example with the value of the drive type of the next parked vehicle in this parking lot.

During the parking process, a second temperature profile is recorded and evaluated either continuously or at intervals. During this evaluation, the recorded temperature profile is compared with temperature profiles. In order to be able to determine more quickly and reliably whether or not a fire is present, the comparison is made only with the temperature profiles known for the known drive type. If a fire is present, the temperature profile is typical for the drive type. If the drive type is known and the second temperature profile is compared with temperature profiles of developing fires for this drive type, then an actual fire or an imminent fire can be concluded with high probability.

If the vehicle enters the parking lot and the parking process begins, a temperature profile that is characteristic of the drive type of the parked vehicle is detected. This detection also determines that a corresponding vehicle has been parked in the parking lot. Therefore, depending on the evaluation, an occupancy of the parking lot is signaled. If the vehicle moves away from the parking lot again, this can also be detected by the temperature profile, where applicable, and corresponding occupancy information is output.

According to an embodiment, it is proposed that the output of the signal is dependent on the determined drive type. For example, it is conceivable that the signal is a fire pre-alarm if, for example, in the case of a battery-powered vehicle, a temperature increase or temperature gradient is detected after a certain minimum period after the start of the parking process. This can indicate that the battery is heating up and signal that a fire may be imminent. By such a pre-alarm, measures can already be taken to prevent the fire.

According to an embodiment, it is proposed that a plurality of temperature sensors is assigned to the evaluation unit and that the evaluation unit evaluates their temperature profiles. In particular, at least one temperature sensor can be exclusively assigned to each parking lot and it can be stored in the evaluation unit which parking lot is assigned to which temperature sensor. Thus, not only can a fire be detected, but it can also be spatially assigned to a parking lot.

According to an embodiment, it is proposed that the evaluation unit triggers an optical path marking depending on the evaluation. In a parking garage or an underground parking lot, optical path markings can be provided for traffic flow control. These are usually used to guide vehicles to free parking lots. However, if a fire or pre-alarm occurs, for example if a battery is heating up, it may be useful to guide firefighters to the fire hazard or location as quickly as possible. Since the position of the fire, in particular the parking lot of the burning passenger car, is known through the evaluation, the evaluation unit can control the path marking in such a way that the fire department is guided directly to the source of the fire.

According to an embodiment, it is proposed that as soon as a fire has been detected or, for example, a pre-alarm has been issued in the case of a heated battery, the corresponding parking lot is blocked off for further vehicles and, for example, the blockage is indicated by means of the optical path marking. Also, a parking deck or a spatial area around this parking lot can be blocked and the path marking can be controlled so that no further vehicles are directed into this area.

Another aspect is an evaluation unit as described herein.

In the event of a signal, for example a pre-alarm or a fire alarm signal, security measures can be initiated by the evaluation unit. For example it is possible, in the event of a fire signal, to block the area of the parking lot from which the signal was triggered, such as blocking a corresponding parking deck. It is also possible that a ventilation or a fire-fighting system is activated in this area. It is also possible that electrical installations, such as electrical charging stations, possibly existing in this area are automatically deactivated. Escape pathmarkings can be activated to facilitate escape from the area. Since both the type of drive and the location of the fire or fire hazard are known by the solution according to the subject matter, countermeasures such as those mentioned above and others can be initiated immediately and automatically.

BRIEF DESCRIPTION OF THE DRAWINGS

In the following, the subject matter is explained in more detail by means of a drawing showing exemplary embodiments. In the drawing show:
FIG. 7 illustrates the evaluation of temperature profiles.

DESCRIPTION OF THE INVENTION

Figure 1:
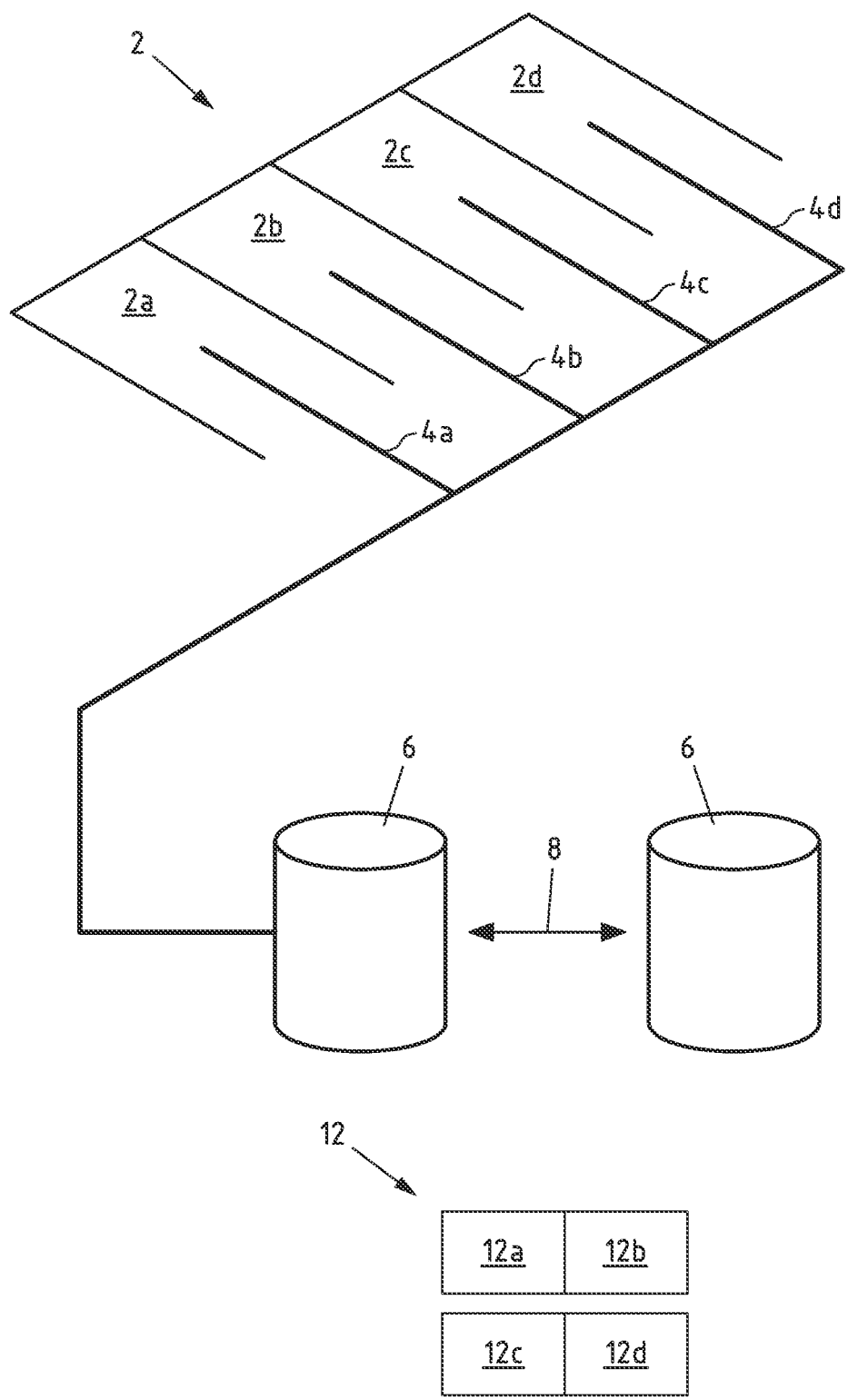
FIG. 1 is an object parking space management system.

FIG. 1 shows a parking space 2 of a parking space management system with a plurality of parking lots 2a, b, c, and d. A temperature sensor 4a-d extending in the longitudinal direction may be arranged at the bottom of the respective parking lots 2a-d. The temperature sensor 4a-d may be, for example, a fiber line, in particular a fire alarm fiber optic line. Using suitable control means (not shown), both a temporal temperature profile and a spatially resolved temperature profile can be recorded along temperature sensors 4a-d. The captured temperature profiles are assigned to one of the parking lots 2a-d and fed to an evaluation circuit 6. In the evaluation circuit 6, a hereafter described comparison of the captured temperature profiles with stored temperature profiles in order to send information about the occupancy of the parking lot 2 to a fire alarm control panel 10 in a signal 8.

The signal 8 can be, for example, a first signal 12 in which information 12a about a parking lot 2a-d is linked to information 12b about a drive type of a vehicle parked in the parking lot 2a-d. However, a signal 12 can also be an alarm signal in which information 12a about a parking lot and information 12c about a detected fire or an unusual temperature development at one of the parking lots 2a-d is included together, for example, also with a drive type. The signal 8 is transmitted from the evaluation unit 6 to a fire alarm control center 10.

Figure 2:
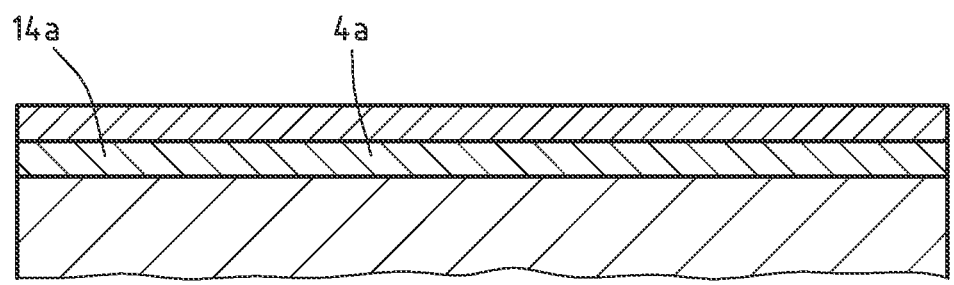
FIG. 2 is a temperature sensor in the floor of a parking lot.

A temperature sensor 4a formed as a fiber conductor may, for example, be embedded in a cover layer 14a, as shown in FIG. 2. This prevents the temperature sensor 4a from being damaged by vehicles driving over it.

Figure 3:
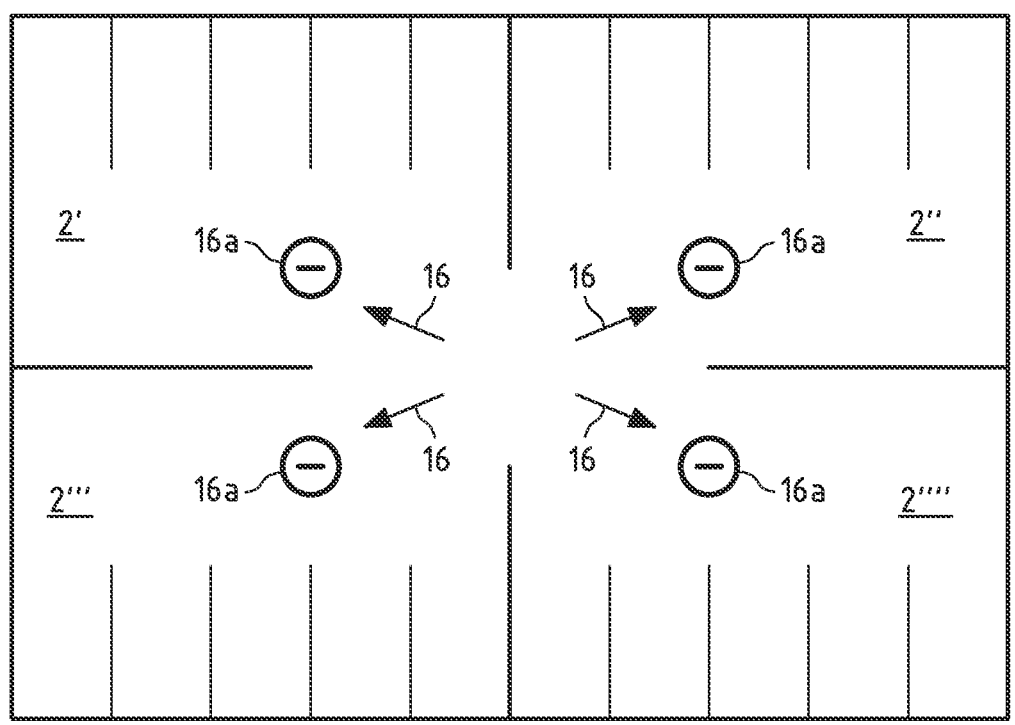
FIG. 3 shows path markings in a parking space.

The parking lots 2a-d of the parking area 2 may be arranged in different parking decks 2', 2", 2''' and 2'''' side by side and/or on top of each other, as shown in FIG. 3. Way markers 16 may point to the different parking decks 2'-2''''. The way markers 16 may also include information signs 16a. The path markings 16 as well as the signs 16a can be controlled by the evaluation unit 6 and/or the fire alarm control center 10, for example, in order to direct a fire department to the affected parking lot 2a-d in the event of a fire or to prevent access to a parking deck 2'-2'''' via a sign 16a for further vehicles.

As already explained, a temporal temperature profile of a parked vehicle is characteristic of the drive type of the vehicle.

Figure 4A:
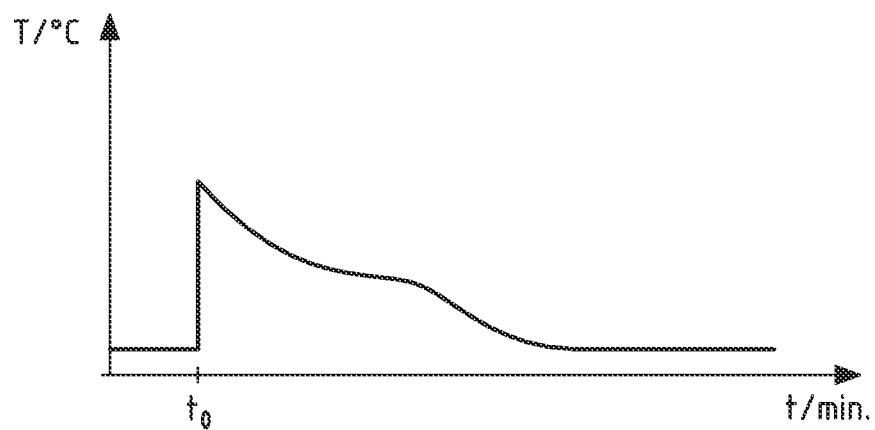
FIG. 4a-c are temperature-time profiles.

FIG. 4a shows, as an example, a temperature profile over time of a vehicle with a combustion engine. At time t0, the vehicle is parked and the temperature rises rapidly because the combustion engine is hot. The temperature decrease is degressive, since the engine fan at first still runs and subsequently, cooling takes place by pure convection.

Figure 4B:
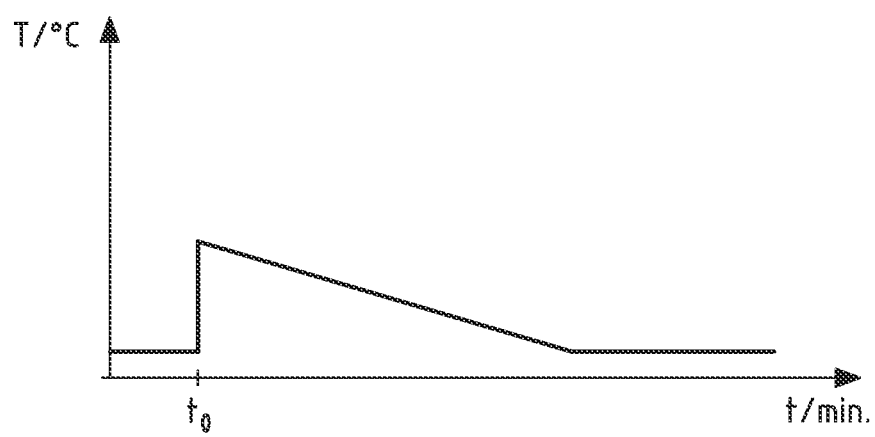

FIG. 4b shows, as an example, a temperature profile for a battery-electric vehicle. At time t0, the vehicle is parked and the vehicle is slightly heated, for example in the area of the battery due to the high current flows. The cooling is generally linear and slower than with an combustion engine, as can be seen from the temperature profile.

Figure 4C:
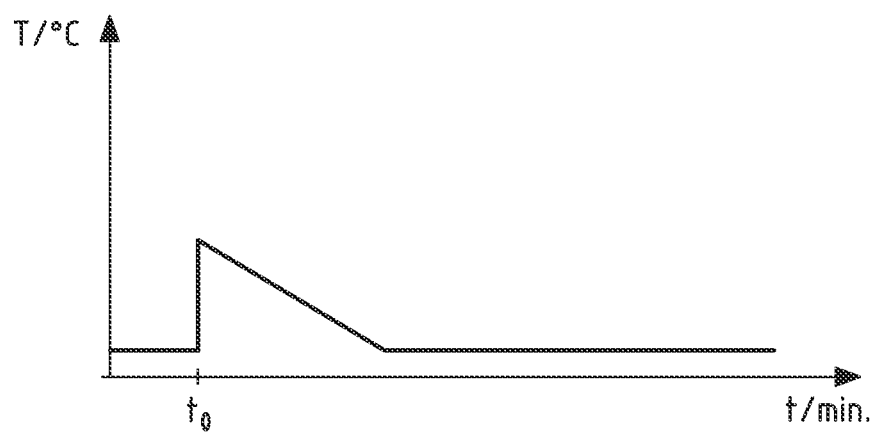

FIG. 4c shows, as an example, a temperature profile for a fuel cell vehicle. Here, the initial temperature at time t0, when the vehicle is parked, is approximately the same as that of the battery-electric vehicle shown in FIG. 4b, but cooling is faster because the heat capacity of the battery is not there and thus less heat energy is stored.

Based on these three exemplary temperature profiles, it can be seen that the evaluation unit 6 can determine a drive type of a vehicle at the beginning of a parking operation.

Figure 5A:
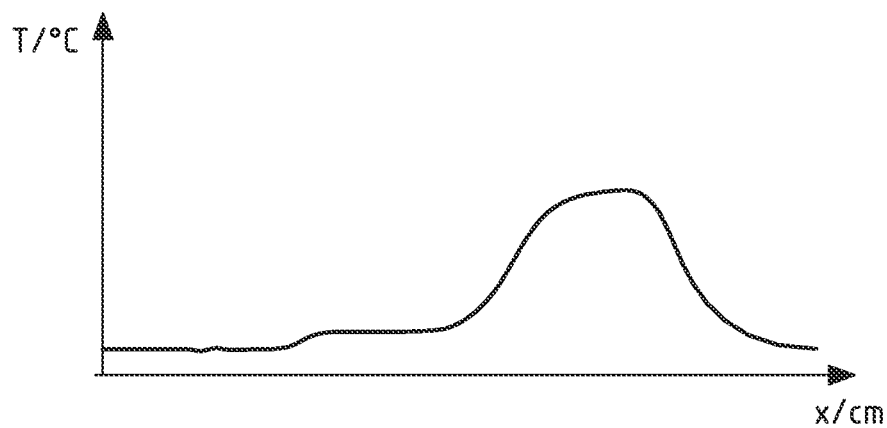
FIG. 5a-c are temperature-location profiles.

FIG. 5*a* shows an exemplary temperature profile over the longitudinal extension direction of a temperature sensor 4*a-d* of a combustion engine. It can be seen that, for example, in a front area, where the combustion engine is, there is an elevated temperature, but the underbody is relatively cool, and in the rear area the temperature is almost the same as the ambient temperature.

Figure 5B:
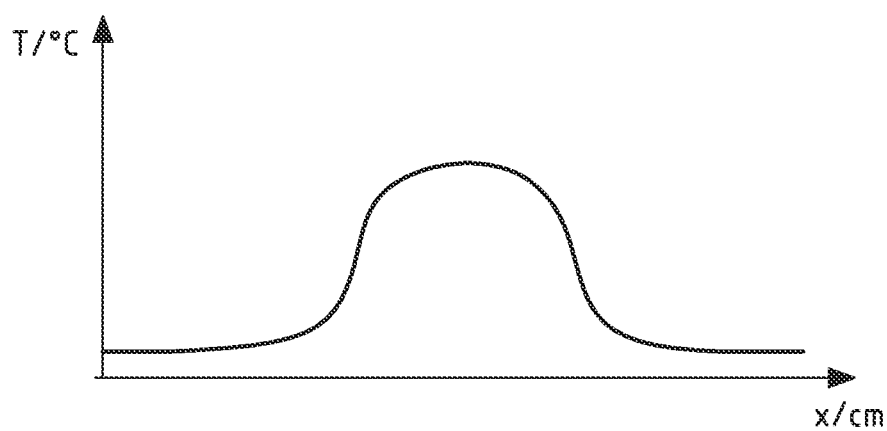

This is different in the case of a battery-electric vehicle, of which the spatial temperature profile is shown as an example in FIG. 5*b*. There, the underbody, where the battery is located, will generally be hotter than the front and rear of the vehicle.

Figure 5C:
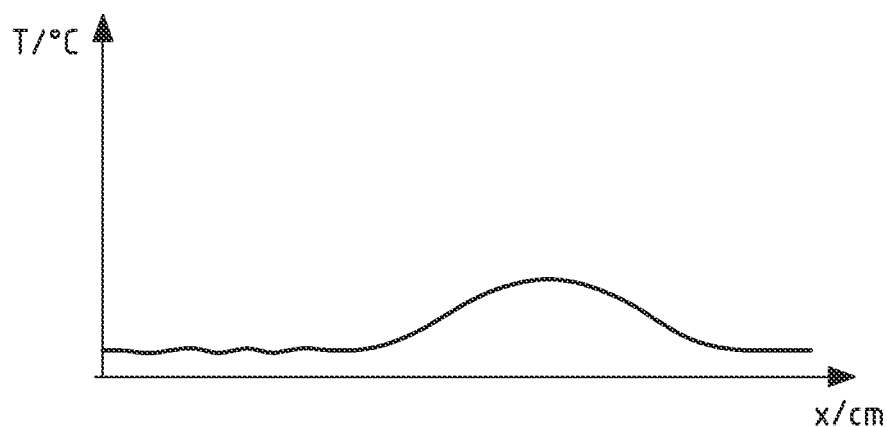

FIG. 5*c* shows an exemplary spatial temperature profile of a fuel cell vehicle. There, due to the absence of the battery, the front of the vehicle is expected to have an increased temperature, but the underbody and rear will not have an increased temperature.

A drive type can also be determined on the basis of the spatial temperature profile according to FIGS. 5*a-c*.

Figure 6A:
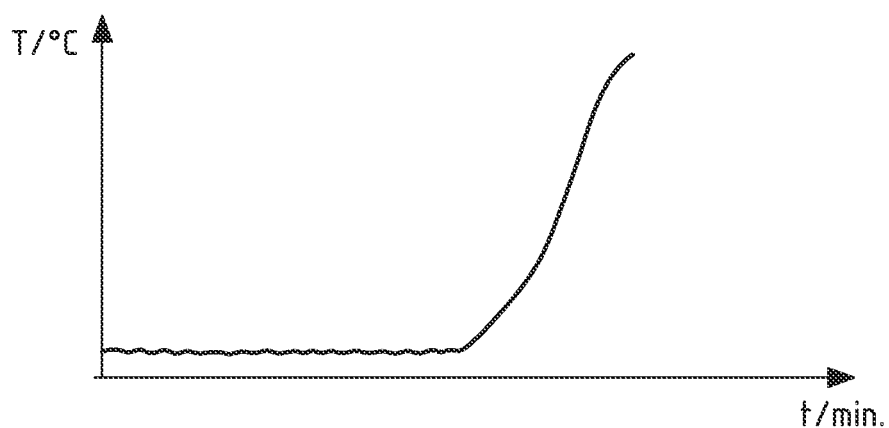
FIG. 6a-c are temperature-time profiles during a fire.
Figure 6B:
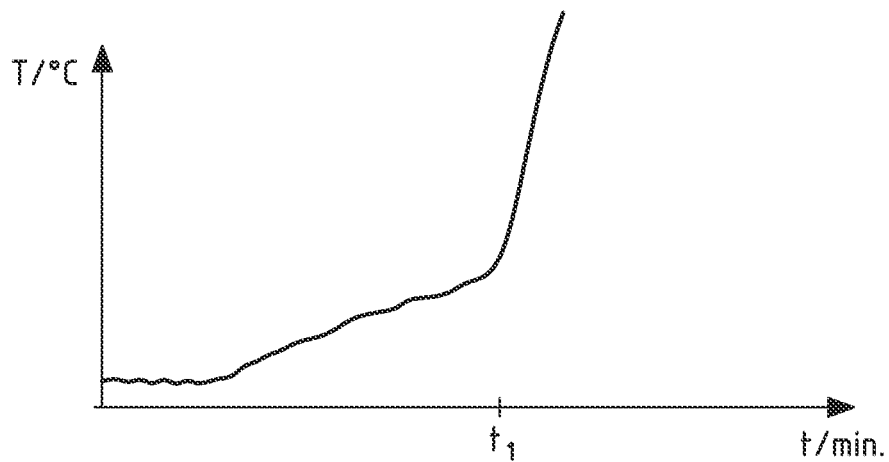
Figure 6C:
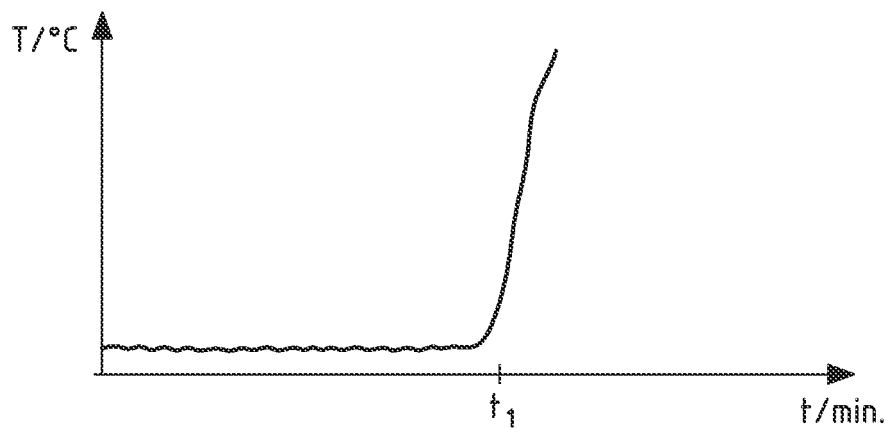

FIGS. 6*a-c* show exemplary temperature profiles of the different drive types in the event of a fire.

FIG. 6*a* shows that in the case of a fire in a combustion engine, the temperature increases linearly and rapidly.

In FIG. 6*b*, which shows a fire of a battery electric vehicle, it can be seen that before a sharp rise in temperature, the temperature first rises slightly, due to short circuits within the battery modules, for example. At time t1, the internal temperature of the battery can be so high that a "tripping point" is reached and the battery starts to burn, whereupon a steep rise in temperature can then be expected.

FIG. 6*c* shows an exemplary temperature profile for a fire of a fuel cell vehicle. Up to time t1, when the fire occurs, no temperature increase can be measured. As soon as the fire occurs, a very steep temperature rise is to be expected, possibly steeper than in the case of the combustion engine shown in FIG. 6*a*.

The temperature profiles shown are purely exemplary and are only intended to illustrate that both a temporal and a spatial temperature distribution can provide insight about a drive type on the one hand and about the danger or presence of a fire on the other.

Various clusters 16*a-c* are provided in the evaluation unit 6. In each cluster 16*a-c*, different temperature profiles 18 are stored for a specific drive type. For example, a first temperature profile 18 may represent a temporal temperature profile at the beginning of a parking process. A further temperature profile 18 may represent a spatial temperature profile at the beginning of a parking process. A further temperature profile 18 may represent a temporal temperature profile during a fire, and finally, a further temperature profile 18 may represent a spatial temperature profile during a fire. For each of these temperature profiles, a set of characteristic temperature profiles 18 may be stored, so that one or more temperature profiles 18 are stored for each drive type for each case.

If a temporal temperature profile 20*a* is now captured by the evaluation unit 6, this is compared with the temporal temperature profiles 18 of the various clusters 16*a-c*. Here, for example, a cross-correlation can be performed and the temperature profile 18 that has the smallest deviation compared to the measured temperature profile 20*a* can be determined. From this, for example, the drive type can be concluded.

If later, a second temperature profile 20*b* is measured, for example at a later time, this can be compared, for example, with temperature profiles 18 of clusters 16*a-c*, which indicate a fire. If the drive type is known in advance, a comparison can be made only with the temperature profiles 18 of the cluster 16*a-c* which is assigned to this drive type. If the deviation of the measured temperature profile 20*b* from the stored temperature profiles 18 is below a threshold value, for example, a warning signal, a fire signal or the like, for example a signal 12 with the information 12*a-c* can be output.

The invention claimed is:

1. A parking space management system comprising,
   a temperature sensor attachable to the floor of a parking lot,
   an evaluation unit connected to the temperature sensor, wherein
   the evaluation unit by means of the temperature sensor evaluates at least one temperature profile in the region of the temperature sensor and depending on the temperature profile outputs a signal
   wherein
   the evaluation unit compares a detected temperature profile with stored temperature profiles and, depending on the comparison, determines a drive type of a vehicle parked in the parking lot.

2. The parking space management system according to claim 1,
   wherein
   the temperature sensor is an fiber line and/or the temperature sensor is an electrical sensor.

3. The parking space management system according to claim 1,
   wherein
   the temperature sensor is integrated into the floor of the parking lot.

4. The parking space management system according to claim 1,
   wherein
   the evaluation unit evaluates a temporally first temperature profile and determines a drive type on the basis of an evaluation and then evaluates a temporally second temperature profile depending on the determined drive type in order to output the fire alarm signal.

5. The parking space management system according to claim 1,
   wherein
   the evaluation unit signals an occupancy of the parking lot depending on an evaluation.

6. The parking space management system according to claim 1,
   wherein
   the output of the signal is dependent on the particular drive type.

7. The parking space management system according to claim 1,
   wherein
   the evaluation unit evaluates a plurality of temperature sensors.

8. The parking space management system according to claim 1,
   wherein
   the evaluation unit controls an optical path marking depending on an evaluation, wherein the optical path marking leads to the parking lot for which the signal was output.

9. The parking space management system according to claim 1,
   wherein
   the evaluation unit, depending on an evaluation, blocks the parking lot for which the signal was output by means of an optical path marking.

10. An evaluation unit for a parking space management system comprising,
    at least one input, arranged for coupling with a temperature sensor arranged at the floor of a parking lot, wherein
    the evaluation unit uses the temperature sensor to evaluate at least one temperature profile at the parking lot and outputs a signal depending on the temperature profile
    wherein
    the evaluation unit compares a detected temperature profile with stored temperature profiles and, depending on the comparison, determines a drive type of a vehicle parked in the parking lot.

\* \* \* \* \*